(No Model.)

C. PAY.
DUMPING WAGON.

No. 463,254. Patented Nov. 17, 1891.

WITNESSES. INVENTOR.
Charles Hannigan Charles Pay
James E Arnold By Benj Arnold

UNITED STATES PATENT OFFICE.

CHARLES PAY, OF PROVIDENCE, RHODE ISLAND.

DUMPING-WAGON.

SPECIFICATION forming part of Letters Patent No. 463,254, dated November 17, 1891.

Application filed August 22, 1891. Serial No. 403,384. (No model.)

*To all whom it may concern:*

Be it known that I, CHARLES PAY, of Providence, in the county of Providence and State of Rhode Island, have invented certain new and useful Improvements in Carts; and I do hereby declare that the following is a full, clear, and exact description thereof, reference being had to the accompanying drawings, and to the letters of reference marked thereon, which form a part of this specification.

This invention relates to that class of mechanical devices designed to facilitate the unloading of carts in the well-known way of elevating the forward end of the cart-body sufficiently high to dump or discharge the load from the rear end of the cart. In heavy four-wheeled carts the body is usually tipped on or over the back axle as a fulcrum, and the center of gravity of the load is necessarily brought to a considerable distance forward of that axle, so as to throw a large portion of the load on the forward axle to relieve the hind wheels and also to keep the forward end of the cart down firmly to the axle to prevent the pounding on that axle, which would otherwise result if the load were more nearly balanced on the back axle. This disposition of the load largely increases the weight to be raised in tipping the body to unload, and necessitates the use of mechanical devices to enable the driver to tip the cart without assistance. These improvements are fully illustrated in the accompanying drawings.

Figure 1:
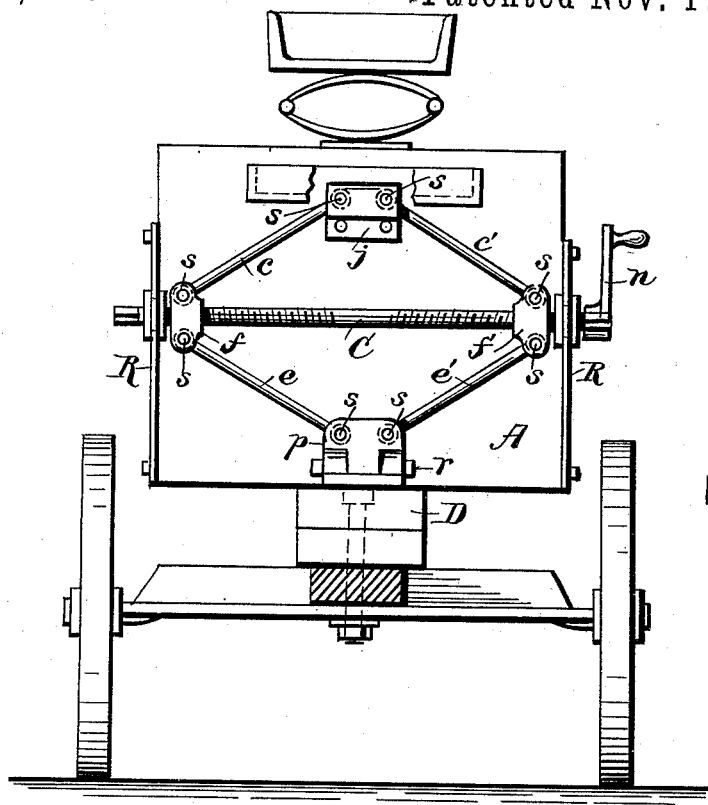
Figure 2:
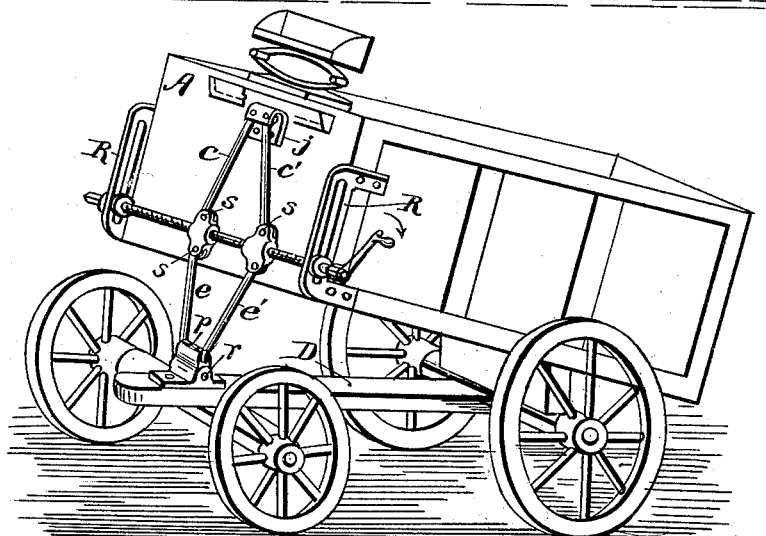

Figure 1 shows a front elevation of a cart with the lifting devices applied and the body of the cart level, as it is when loaded. Fig. 2 is a perspective view of the front and side of the cart, showing the position of the lifting devices when the body of the cart is tipped up to unload.

The operating devices, as shown in the drawings, consist of a horizontal screw C, placed across the front of the cart-body A, and having a left-hand screw-thread made on that part of it to the right of its middle, and a right-hand screw-thread made on that part to the left of the middle, and each part has a nut $ff'$ fitted to the thread on it. These nuts have double ears or lugs made on their upper and lower sides, between which the ends of the toggle-bars $c\ c'$ and $e\ e'$ are pivoted, and the pins $s\ s$, passing through the ears of the nuts and the holes in the ends of the bars. The two upper toggle-bars $c\ c'$ have their lower ends pivoted to the ears on the upper sides of the nuts $ff'$, and their upper ends held by pivots $s'$ in the plate $j$, which is fast on the front of the cart. The two lower toggle-bars $e\ e'$ have their upper ends pivoted in like manner to the ears on the under sides of the nuts $ff'$ and their lower ends held between ears on a block $p$, which in turn is held by the pin $r$ between the ears of the plate $h$, secured to the tongue or bar D, the back end of which is fast to the back axle. The pin $r$ is placed in position across the cart to allow the toggle-bars to swing back and forward as the cart front is raised and lowered.

Guide-plates R are fastened one on each side of the cart at the front end, and vertical slots are made in them, through which the ends of the screw C project to receive a crank $n$ to turn the screw by. The crank $n$ is preferably squared onto both ends of the screw, or otherwise removably secured thereto, so that it may readily be applied to it on either side of the cart, as may be most convenient, or taken off out of the way when not needed. The plates R hold the ends of the screw steady when it is being turned by the crank $n$ and prevent it from swinging back and forward and cramping the ends of the toggle-bars on their pivots.

The operation is as follows: When the front end of the cart is down, the toggle-bars, screw, and other parts are in position, as shown in Fig. 1. When it is desired to raise it to dump or discharge the load from the cart, the crank $n$ is put on one end of the screw on that side of the cart most convenient and turned in direction of the arrow by the driver standing on the ground by the side of the cart. The turning of the screw C in that direction by the crank will cause that part of it in the nut $f'$ to carry that nut toward the middle of the screw, and the nut $f$ will in like manner be moved by the part of the screw in it toward the same point. The drawing together of the nuts toward the middle of the screw and the ends of the toggle-bars pivoted in them will straighten up the angle of the bars and raise the front end of the cart by the plate $j$, to which the upper end of the bars $c$ $c'$ are pivoted and which is fast to the cart front. The raising is continued until the cart-body A is tipped on the back axle to an angle sufficiently inclined to cause the load to slide out of the cart, when by turning the crank $n$ in the opposite direction the cart-body will be returned to its first position, as in Fig. 1. By the use of the toggle-bars and screw in this way the unloading can be accomplished easily and quickly with a screw of low pitch or slight angle of thread across its periphery, which will not allow the nuts on it to be run back by any amount of pressure on them. Consequently the raising may be interrupted and left at any point, if necessary, and the crank left entirely free with perfect safety, as the toggle-bars cannot turn the screw backward by pressure on the screw-nuts, however heavy a load the cart may carry.

Having thus shown and described my improvements, I claim as my invention and desire to secure by Letters Patent—

1. In combination with a cart, two sets of toggle-levers having the upper end of each set pivoted to the cart-body and the lower end of each set supported by the front axle, and their middle joints connected with each other by means of a screw having right and left screw-threads thereon and nuts to fit said threads, substantially as set forth.

2. The combination of bars $c$ $e$, bars $c'$ $e'$, connected by nuts $f f'$, screw C, having a right and left handed screw-thread thereon, nuts $f$ $f'$, fitted on said screw, plate $j$, guide-plates R, block $p$, and plate $h$, with a cart, substantially as described.

CHARLES PAY.

Witnesses:
CHRISTOPHER B. LITTLE,
BENJ. ARNOLD.